Sept. 15, 1931.   G. C. MONCKMEIER   1,823,461
BEARING CAP FACER
Original Filed Aug. 22, 1928   3 Sheets-Sheet 2
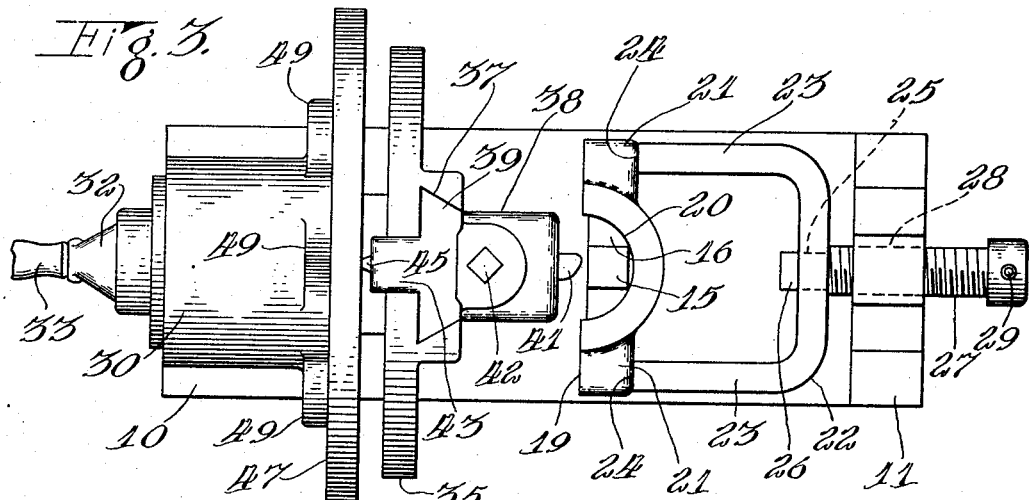
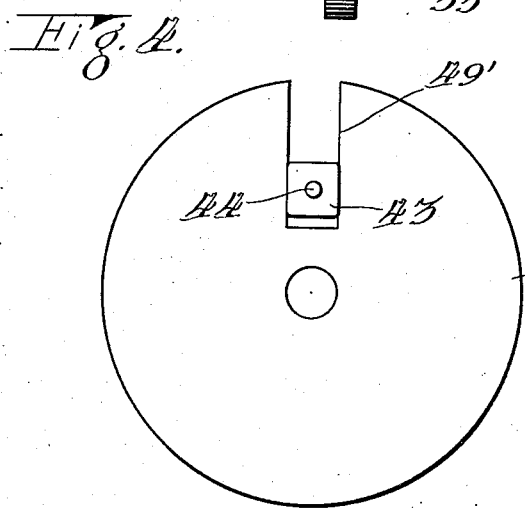
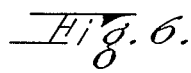
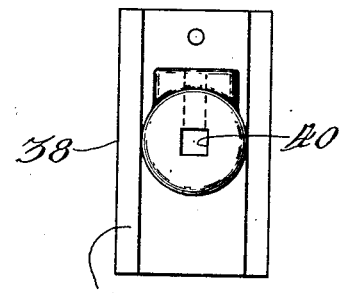
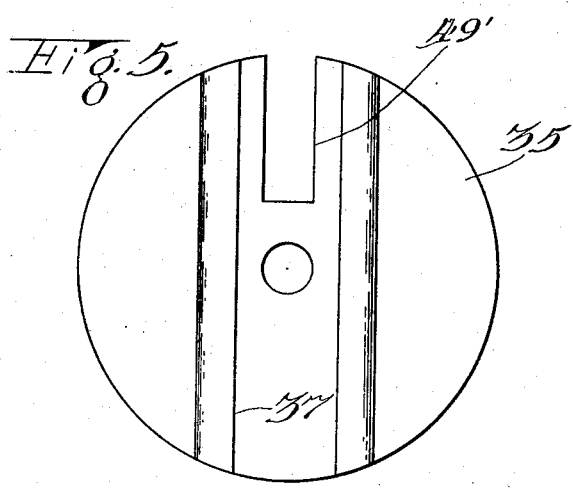
Inventor.
Gustav C. Monckmeier.
By John P. Smith
Atty.

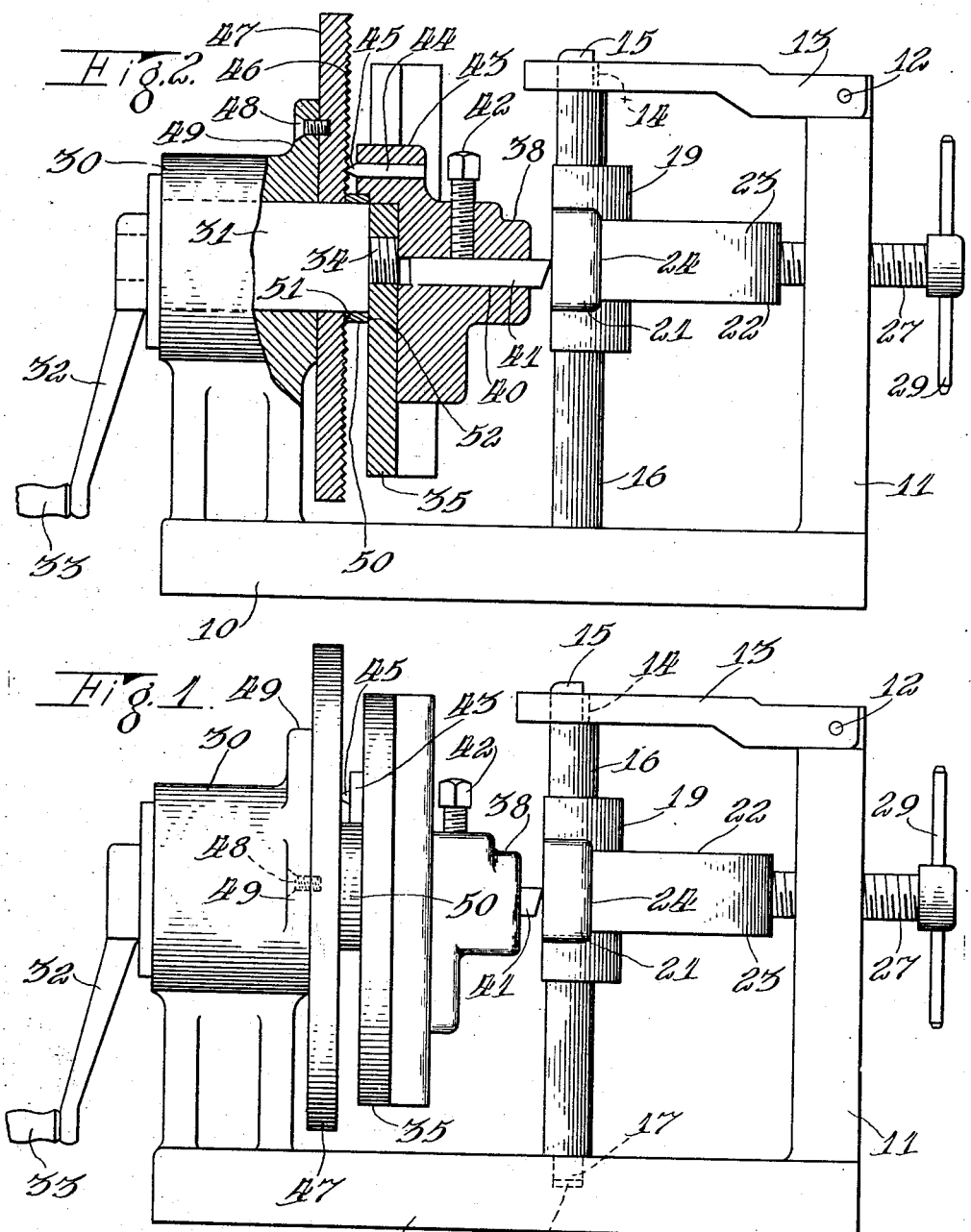

Sept. 15, 1931. G. C. MONCKMEIER 1,823,461
BEARING CAP FACER
Original Filed Aug. 22, 1928 3 Sheets-Sheet 3
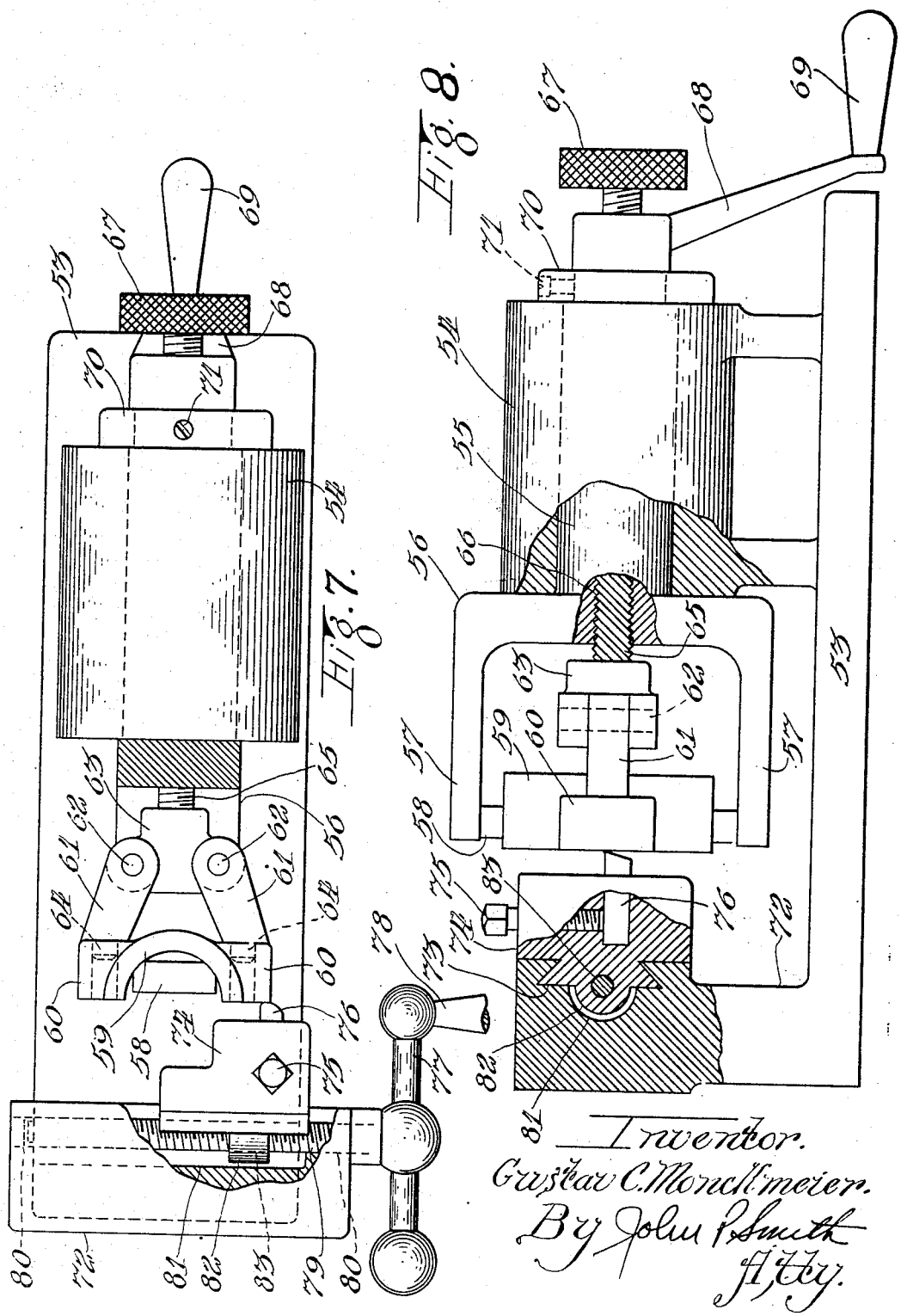
Inventor.
Gustav C. Monckmeier.
By John P. Smith
Atty.

Patented Sept. 15, 1931

1,823,461

UNITED STATES PATENT OFFICE

GUSTAV C. MONCKMEIER, OF TIPTON, IOWA

BEARING CAP FACER

Application filed August 22, 1928, Serial No. 301,259. Renewed June 18, 1931.

The present invention is directed to a novel and improved construction of a bearing cap facer.

One of the objects of the present invention is to provide a novel and improved form of a bearing cap facer which may be power driven or manually operated and is provided with an automatic feed.

Another object of the invention is to provide a novel and improved form of a bearing cap facer which is simple in construction, compact in form, and which at the same time, holds the bearing which is to be faced stationary and permits the tool to revolve for facing the cap.

Another object of the invention is to provide a novel, improved and simplified construction of a bearing cap facer, which in addition to supporting the cap stationary on the device and revolving the tool with respect thereto, automatically feeds the tool diametrically across the face of the cap.

These and other objects are accomplished by providing a construction and an arrangement of the various parts in the manner hereinafter described and particularly pointed out in the appended claims.

Referring to the drawings, Fig. 1 is a side elevational view, illustrating one form of my improved bearing cap facer.

Fig. 2 is a side elevational view of the same, showing parts thereof in cross section.

Fig. 3 is a top plan view of the device shown in Figs. 2 and 1.

Fig. 4 is a detailed front elevational view of the tool supporting disc member.

Fig. 5 is a detailed rear elevational view of the tool supporting member.

Fig. 6 is a detailed view of the tool carrying block.

Fig. 7 is a top plan view of a modified form of a bearing cap finishing device showing parts thereof in cross section and in which the feed is manually controlled, and Fig. 8 is a side elevational view of the device shown in Fig. 7, with portions thereof shown in cross section.

In illustrating one of the forms of my invention, I have shown the same as comprising a base or block member 10 which has located on one end thereof and formed integrally therewith the vertically extending end or wall 11. Pivotally mounted to the upper end, as shown at 12, is a locking member 13 which has located on its free end thereof a rectangular aperture 14 which is adapted to receive in engagement, a square projection 15 formed on the upper end of the semi-cylindrical bearing cap supporting member 16. The lower end of the cap supporting member 16 is provided with a reduced downwardly projecting square end as shown at 17, which is adapted to be seated in a square socket 18, located in the upper surface of the base 10. Mounted on the supporting member 16 is a bearing cap 19 which has its semi-cylindrical portion as shown at 20 engaging the semi-cylindrical portion of the supporting member 16. This bearing cap 19 is provided with the usual apertured ears 21. This bearing cap is clamped on the supporting member 16 by a U-shaped member 22 which has its legs 23 engaging the outer end of the ears 22 as shown at 24. Located centrally of the clamping member 23 is an aperture 25. The member 23 is journaled on a reduced portion 26 of a clamping screw 27. The clamping screw 27 is mounted in a threaded aperture 28 of the vertical wall 11. The outer end of the clamping screw 27 is provided with a handle grip 29 for permitting the operator to clamp the bearing cap 19 in position. Located on the other end of the base member 10 and preferably formed integrally therewith, is a bearing portion 30 which has journaled therein a shaft 31. Secured to one end of the shaft 31 in any well known manner is a crank 32 which is provided on its free end with an operating handle 33. The other end of the shaft is provided with a reduced, threaded portion as shown at 34, which receives in threaded engagement therewith, a tool supporting disc 35.

One of the essential features of the present invention is the provision of a feeding mechanism for automatically feeding the tool across the face of the bearing cap as the tool is revolved. This mechanism comprises the revolving tool supporting disc 35, which in turn is provided with a dove-tailed shaped groove as shown at 37, diametrically across the front face thereof for receiving a complementary shaped tool block 38. This tool block 38 is provided with a dove-tailed shaped portion 39 which is adapted to be reciprocally mounted in the dove-tailed recess 37 of the revolving disc 35. The tool block 38 is provided with a longitudinally extending square recess 40 in which is mounted a facing tool 41. The facing tool 41 is secured in a tool block 38 by means of a set screw 42. Formed integrally with the tool block and projecting rearwardly therefrom is a boss 43. Mounted in the boss and secured therein in any well known manner, is a pin 44 which has one end thereof pointed as shown at 45 and adapted to engage a spirally arranged groove or thread 46 formed in a disc 47. The disc 47 is secured to the bearing 30 by means of screws 48, which extend through spaced apart ears 49 formed integrally with the bearing 30. The boss 43 together with the pin 44 is adapted to move radially with respect to the shaft 31 in a slot 49, formed parallel with the dove-tailed recess 37 in the tool carrying disc 35. The thrust pressure on the tool 41 is sustained by a bearing collar 50 which well might be an antifriction bearing when necessity requires. This bearing collar engages a flat surface as shown in 51 on the inner edge of the disc 47 and engages the rearward surface of the disc 35 as shown at 52. From the above description, it will be noted that as the crank 32 is manually revolved, the shaft 31 carrying the tool supporting disc 35, tool block 38 and tool 41 is likewise revolved, while the bearing cap 19 is held stationary, and during the revolving movement of the tool, the block 38, through the action of the pin 45 engaging the spirally arranged groove 46 in the disc 47 is moved outwardly so that the face of the bearing cap is finished from the center, outwardly until the cap is completely faced on both sides. This arrangement provides a very simple construction of an automatic feed for moving the tool across the face of the cap from the center portion to the outer edge, thereby insuring an accurate and perfect face on the cap.

In the modified form of my invention shown in Figs. 7 and 8, I have provided a manual feed for moving the tool in a rectilinear direction across the face of the bearing cap, but in which I revolved the bearing cap instead of the tool as shown in the construction in Figs. 1 to 6, inclusive. In the modified form, I have provided a base member 53 which has formed integrally therewith a bearing portion 54 in which is journaled a shaft 55. Formed integrally with or secured to the shaft 55 in any well known manner, is a U-shaped member 56. Supported in the outer arms 57 of the U-shaped member 56 in any well known manner, is a bearing cap supporting member 58 on which is mounted a bearing cap 59. The bearing cap 59 is provided with the usual apertured ear portions 60. The bearing cap 59 is clamped to the cap supporting member 58 by a clamping mechanism which consists of two pivoted arms 61, pivoted at 62 to a swivel member 63. The outer or free ends of these arms 61 are provided with angularly disposed projecting portions 64 which are adapted to engage the apertures in the apertured ears 60 of the bearing cap 59. The swivel member 63 is journaled on the inner end of a threaded shaft 65 which is mounted in a threaded aperture 66 extending longitudinally through the shaft 55. The outer end of the threaded shaft 65 is a thumb screw 67, by means of which the shaft 65 may be longitudinally adjusted with respect to the U-shaped member 56 and shaft 55 so that the bearing cap 59 may be clamped in position on the cap supporting member 58. Secured in any well known manner to the outer end of the shaft 55 is a crank 68 which is provided with a handle 69 for revolving the shaft 55 together with the bearing cap. The shaft 55 is secured against displacement in the bearing 54 by a collar 70 which is secured to the shaft by means of a set screw 71. Mounted on the other end of the base 53 and formed integrally therewith, opposite the bearing 54 is a vertically disposed wall 72 which is provided with a transverse horizontal dove-tailed shaped groove 73 in which is reciprocally mounted a complementary dove-tailed shaped tool carrying block 74. Secured in the tool block 74 by means of a set screw 75 is a facing tool 76 which protrudes in a direction toward the face of a bearing cap 59 and is adapted to be moved across the face of the cap for finishing the same. The tool is manually manipulated by a crank 77 which in turn, is also provided with a handle 78. The crank is secured to a threaded shaft 79 which, in turn, is journaled in two transversely extending spaced apart aligned apertures 80, located in the wall 72. Concentrically with the two aligned apertures and located centrally of the dove-tailed recess 73 is a relatively larger circular recess 81 which accommodates the circular band 82, formed integrally with the tool block 74. Extending longitudinally through this band is a threaded bore 83 which receives the shaft 79 in threaded engagement therewith for moving the tool 76 across the face of the bearing cap 59.

In the operation of the above described modified form shown in Figs. 7 and 8 of the drawings, it will be noted that by manipulating the hand screw 67, the threaded shaft 65 is adjusted longitudinally in the shaft 55, for either clamping or unclamping a bearing cap 59 to the cap supporting member 58. When a cap is secured or clamped in a position shown in Figs. 7 and 8, the crank handle 69 may be revolved in a counter clockwise direction and by manipulating the crank handle 78 simultaneously, the tool may be moved across the face of the cap simultaneously with the revolving of the bearing cap for thereby finishing the face of the cap in an accurate and perfect manner.

From the above description, it will be seen that I have provided a simple and compact form of a bearing cap facer and one in which the movement of the tool across the face of the bearing cap is automatic and simultaneous with the revolving of the tool and the other of which, the feed of the tool is manually moved across the face of the cap while the cap is revolved. These two forms of the bearing cap finishing device affords a construction in which the bearing caps may be quickly and easily removed and at the same time finished in accordance with requirements.

While in the above specification I have described one embodiment which my invention may assume in practise and two modifications thereof, but it will, of course, be understood that additional changes and modifications may be made without departing from the spirit and scope of the invention as expressed in the following claims.

What I claim as my invention and desire to secure by Letters Patent is:

1. A bearing cap facer comprising a frame, means for supporting a bearing cap thereon, a revolving tool mounted on said frame, a member secured to said frame having a guiding groove therein and means engageable with said groove and actuated by the movement of said revolving tool to move said tool transversely across said bearing cap.

2. A bearing cap finishing device comprising a frame, means for clamping a bearing cap on said frame, a shaft journaled on said frame and a tool carried by said shaft revolvable therewith, a member having a spiral groove therein and secured to said frame, said member positioned concentrically with respect to the axis of said shaft and means engageable with said groove movable transversely with respect thereto by the revolving movement of said tool.

3. A bearing cap finishing device comprising a frame, means for clamping a bearing cap on said frame, a shaft journaled on said frame and a tool carried by said shaft and movable therewith and engageable with a stationary member on said frame for simultaneously moving said tool transversely with respect to said shaft.

4. A bearing cap facer comprising a frame, means for clamping a bearing cap to said frame, a shaft journaled on said frame, a tool carrying block revolvable with said shaft, means including a stationary member mounted on said frame for radially moving said tool block with respect to said shaft simultaneously with the revolving of said shaft for moving said tool across the face of said bearing cap.

5. A bearing cap facer comprising a frame, means for clamping a bearing cap to said frame and guiding means including a stationary member mounted on said frame for revolving a tool in the spiral path across the face of said bearing cap.

6. A bearing cap facer comprising a frame, means for clamping a bearing cap on said frame, a shaft journaled on said frame, a tool carried by said shaft and means including a spirally grooved member secured to said frame for moving said tool in a spiral path across the face of said cap by revolving said shaft.

7. A bearing cap facer comprising a frame, means for clamping a bearing cap carried to said frame, a shaft journaled on said frame, a tool block operatively related to said shaft, a tool secured in said block and a stationary tool guiding member secured to said frame and operatively related to said tool block for simultaneously moving said tool across the face of said bearing cap simultaneously with the revolving of said tool.

8. A bearing cap facer comprising a frame, a bearing cap secured to said frame, a shaft journaled on said frame, a tool carrying disc secured to said shaft, a tool block radially movable in said disc, a tool carried by said block, a disc secured to said frame having a spiral groove formed therein and a pin carried by said block and engageable with said groove for simultaneously moving said block radially with respect to said shaft and across the face of said bearing cap as said shaft is revolved.

9. A bearing cap facer comprising a frame, a cap supporting member mounted in said frame, means for clamping said bearing cap on said cap supporting member, a shaft journaled on said frame, a disc secured to said frame having a diametral dove-tailed slot formed on one side thereof, a tool block having a complementary dove-tailed projection adapted to be reciprocally mounted in the dove-tailed slot formed in said disc, a tool carried by said block, there being a radial slot formed in said disc extending parallel with the dovetailed recess formed therein, a disc secured to said frame having a spirally arranged groove formed on one face thereof, and a pin secured to said block extending through the slot in said disc and engaging the groove in said second named disc for automatically moving said tool across the face of said cap during the revolving movement of said shaft.

10. A bearing cap facing device comprising a frame, a shaft journaled in said frame, a substantially U-shaped member secured to said shaft, a cap supporting member mounted on one end of said U-shaped member, a longitudinally extending threaded bore formed in said shaft and clamping means including a threaded shaft mounted in threaded engagement with the bore in said first named shaft for clamping a bearing cap to said cap supporting member.

11. A bearing cap facing device comprising a frame, a shaft journaled in said frame, a substantially U-shaped member secured to said shaft, a cap supporting member mounted on one end of said U-shaped member, a longitudinally extending threaded bore formed in said shaft, clamping means including a threaded shaft mounted in threaded engagement with the bore in said first named shaft for clamping a bearing cap to said cap supporting member, and manually controlled means mounted on said frame for moving a tool across the face of said bearing cap for finishing said bearing cap.

In testimony whereof I affix my signature
GUSTAV C. MONCKMEIER.